(12) United States Patent
Miura et al.

(10) Patent No.: US 10,291,491 B2
(45) Date of Patent: May 14, 2019

(54) RELAY APPARATUS AND RELAY METHOD

(71) Applicant: FUJITSU LIMITED, Kawasaki-shi, Kanagawa (JP)

(72) Inventors: Tomohiro Miura, Itabashi (JP); Satoru Fukuda, Yokohama (JP); Masafumi Inaoka, Yokohama (JP); Tatsuhiro Souda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 15/271,618

(22) Filed: Sep. 21, 2016

(65) Prior Publication Data

US 2017/0104642 A1 Apr. 13, 2017

(30) Foreign Application Priority Data

Oct. 7, 2015 (JP) ................................. 2015-199548

(51) Int. Cl.
*H04L 12/26* (2006.01)
*H04L 12/823* (2013.01)
*H04L 12/24* (2006.01)

(52) U.S. Cl.
CPC .......... *H04L 43/028* (2013.01); *H04L 41/069* (2013.01); *H04L 43/04* (2013.01); *H04L 43/0829* (2013.01); *H04L 47/32* (2013.01)

(58) Field of Classification Search
CPC ......... H04L 43/00; H04L 43/04; H04L 43/06; H04L 43/028; H04L 43/0805; H04L 43/0811; H04L 47/31; H04L 47/32; H04L 29/08027; H04L 29/08036; H04L 29/08045; H04L 61/103; H04L 69/321; H04L 43/12028

See application file for complete search history.

(56) References Cited

U.S. PATENT DOCUMENTS

| | | | |
|---|---|---|---|
| 6,339,790 B1* | 1/2002 | Inoue | H04L 41/00 709/224 |
| 8,750,164 B2* | 6/2014 | Casado | H04L 12/4633 370/254 |
| 2002/0083175 A1* | 6/2002 | Afek | H04L 63/1416 709/225 |
| 2004/0205359 A1* | 10/2004 | Matsuhira | H04L 63/0263 713/154 |

(Continued)

FOREIGN PATENT DOCUMENTS

| | | |
|---|---|---|
| JP | 2007-13990 | 1/2007 |
| JP | 2008-136081 | 6/2008 |
| JP | 2013-240017 | 11/2013 |

*Primary Examiner* — Warner Wong
(74) *Attorney, Agent, or Firm* — Staas & Halsey LLP

(57) ABSTRACT

A relay apparatus includes a memory and a processor coupled with the memory. The processor is configured to determine whether a frame received from a first device is to be discarded. The frame includes first information set at a first communication layer and second information set at a second communication layer different from the first communication layer. The processor is configured to transmit the frame to a second device upon determining that the frame is not to be discarded. The second device is set as a destination in the first information. The processor is configured to extract third information from the second information upon determining that the frame is to be discarded. The processor is configured to output the third information.

19 Claims, 18 Drawing Sheets

| ITEM NUMBER | TIME STAMP | TRANSMISSION SOURCE IP ADDRESS | DESTINATION IP ADDRESS | DISCARD REASON CODE (0xXX) | FRAME LENGTH (byte) | RECEPTION PORT NUMBER |
|---|---|---|---|---|---|---|
| 1 | 2015-01-20 17:26:46.776689000 | 198.51.100.22 | 198.51.100.33 | 0x07 (NUMBER OF RECEIVED FRAMES IN INVALID FORM) | 64 | 1 |
| 2 | 2015-01-20 17:26:47.002554000 | — | — | 0x09 (RECEIVED FRAME OF INVALID LENGTH) | 71 | 1 |
| 3 | 2015-01-20 17:26:47.003530000 | — | — | 0x09 (RECEIVED FRAME OF INVALID LENGTH) | 64 | 1 |
| 4 | 2015-01-20 17:26:47.820341000 | — | — | 0x09 (RECEIVED FRAME OF INVALID LENGTH) | 150 | 1 |
| 5 | 2015-01-20 17:26:48.034267000 | — | — | 0x09 (RECEIVED FRAME OF INVALID LENGTH) | 153 | 1 |
| ... | ... | ... | ... | ... | ... | ... |

520

(56) References Cited

U.S. PATENT DOCUMENTS

| | | | |
|---|---|---|---|
| 2005/0063311 A1* | 3/2005 | Sekiguchi | H04L 43/00 370/241 |
| 2007/0002745 A1 | 1/2007 | Ossman et al. | |
| 2008/0123675 A1 | 5/2008 | Mizusawa | |
| 2008/0170567 A1* | 7/2008 | Joo | H04L 45/04 370/389 |
| 2010/0238801 A1* | 9/2010 | Smith | H04L 45/00 370/229 |
| 2011/0185010 A1* | 7/2011 | Shatsky | H04L 65/80 709/203 |
| 2017/0063882 A1* | 3/2017 | Be'ery | H04L 63/1416 |

* cited by examiner

| TRANSMISSION SOURCE IP ADDRESS | DESTINATION IP ADDRESS | DISCARD INFORMATION SAMPLING FLAG (0:OFF, 1:ON) |
|---|---|---|
| 198.51.100.22 | 198.51.100.33 | 1 |

FIG. 8

| ITEM NUMBER | TIME STAMP | TRANSMISSION SOURCE IP ADDRESS | DESTINATION IP ADDRESS | DISCARD REASON CODE (0xXX) | FRAME LENGTH (byte) | RECEPTION PORT NUMBER |
|---|---|---|---|---|---|---|
| 1 | 2015-01-20 17:26:46.776689000 | 198.51.100.22 | 198.51.100.33 | 0x07 (NUMBER OF RECEIVED FRAMES IN INVALID FORM) | 64 | 1 |
| 2 | 2015-01-20 17:26:47.002554000 | — | — | 0x09 (RECEIVED FRAME OF INVALID LENGTH) | 71 | 1 |
| 3 | 2015-01-20 17:26:47.003530000 | — | — | 0x09 (RECEIVED FRAME OF INVALID LENGTH) | 64 | 1 |
| 4 | 2015-01-20 17:26:47.820341000 | — | — | 0x09 (RECEIVED FRAME OF INVALID LENGTH) | 150 | 1 |
| 5 | 2015-01-20 17:26:48.034267000 | — | — | 0x09 (RECEIVED FRAME OF INVALID LENGTH) | 153 | 1 |
| ... | ... | ... | ... | ... | ... | ... |

| ITEM NUMBER | TIME STAMP | TRANSMISSION SOURCE IP ADDRESS | DESTINATION IP ADDRESS | DISCARD REASON CODE (0xXX) | FRAME LENGTH (byte) | RECEPTION PORT NUMBER |
|---|---|---|---|---|---|---|
| 1 | 2015-01-20 14:56:23.776689000 | 2001:DB8::22 | 2001:DB8::33 | 0x07 (NUMBER OF RECEIVED FRAMES IN INVALID FORM) | 64 | 1 |
| 2 | 2015-01-20 14:56:24.002254000 | — | — | 0x09 (RECEIVED FRAME OF INVALID LENGTH) | 71 | 1 |
| 3 | 2015-01-20 14:56:24.003530000 | — | — | 0x09 (RECEIVED FRAME OF INVALID LENGTH) | 64 | 1 |
| 4 | 2015-01-20 14:56:24.820341000 | — | — | 0x09 (RECEIVED FRAME OF INVALID LENGTH) | 150 | 1 |
| 5 | 2015-01-20 14:56:25.034267000 | — | — | 0x09 (RECEIVED FRAME OF INVALID LENGTH) | 153 | 1 |
| ⋮ | ⋮ | ⋮ | ⋮ | ⋮ | ⋮ | ⋮ |

521

RELAY APPARATUS AND RELAY METHOD

CROSS-REFERENCE TO RELATED APPLICATION

This application is based upon and claims the benefit of priority of the prior Japanese Patent Application No. 2015-199548, filed on Oct. 7, 2015, the entire contents of which are incorporated herein by reference.

FIELD

The embodiment discussed herein is related to a relay apparatus and a relay method.

BACKGROUND

A first technique is known in which, in a network device (for example, a network switch) that performs communication (relaying frames) at the data link layer (layer 2) of the open systems interconnection (OSI) basic reference model over a communication network, the discard reason is displayed for the discarded frame and the discarded frame is output on a different port.

A second technique is also known in which a flag is provided to a processing result of a specific frame that is to be traced, only the processing result to which the flag is appended is stored in memory, and, when the specific frame is normally transferred or discarded, the processing result is output on a different port.

Related techniques are disclosed in, for example, Japanese Laid-open Patent Publication No. 2007-13990 and Japanese Laid-open Patent Publication No. 2008-136081.

In a communication network including a transmission path that couples network switches, when data transmitted from a terminal or the like does not arrive at another terminal or the like which serves as the destination, it is important to know which portion of the network the target data has arrived at, for the purpose of cause analysis and recovery at the time of failure occurrence.

In this regard, with the first technique, although occurrence of discarded frames and reasons for discarding the frames may be identified, in order to determine the association of the discarded frames with the target data, the whole packets contained in all of the discarded frames have to be saved (packet capture) and be analyzed later. Particularly in the case where a communication network includes a large number of network switches, performing a packet capture in each individual network switch results in an enormous storage capacity being used for capturing and also results in imposing a significant analyzing load. This technique is therefore not practical.

With the second technique, the number of discarded frames to be analyzed may be narrowed down based on the count or the like of specific statistical information and error information. However, there is no difference in that, in order to determine whether or not the discarded frames are related to the data in question, packet capture and analysis have to be performed. The problems described above are not solved.

SUMMARY

According to an aspect of the present invention, provided is a relay apparatus including a memory and a processor coupled with the memory. The processor is configured to determine whether a frame received from a first device is to be discarded. The frame includes first information set at a first communication layer and second information set at a second communication layer different from the first communication layer. The processor is configured to transmit the frame to a second device upon determining that the frame is not to be discarded. The second device is set as a destination in the first information. The processor is configured to extract third information from the second information upon determining that the frame is to be discarded. The processor is configured to output the third information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of an extraction condition data table;

FIG. 8 is a diagram illustrating an example of a discard information record data table;

FIG. 9 is a diagram illustrating an example of a discard information record data table;

DESCRIPTION OF EMBODIMENT

Hereinafter, an example of an embodiment will be described in detail with reference to the accompanying drawings.

In a communication network including a transmission path that couples network switches, when data transmitted from a terminal or the like is not delivered to another terminal or the like which serves as the destination, it is important to know which portion of the network the target data has arrived at, for the purpose of cause analysis and recovery at the time of failure occurrence.

In communication at the network layer (layer 3) of the OSI basic reference model, the communication state may be verified between sites using the internet control message protocol (ICMP) or the like. Therefore, a large number of ways to verify which device is reachable are provided.

In communication at the data link layer (layer 2) of the OSI basic reference model (note that, in the description, the Ethernet (registered trademark) is included in the layer 2 for the sake of convenience), there is no measure corresponding to the ICMP. This makes it difficult to verify which device is reachable. In particular, the widespread usage of a virtual private network (VPN) leads to an increase in the number of cases where network switches that perform communication at the layer 2 are installed at geographically apart locations.

According to the present embodiment, a network device that performs communication at the layer 2, which is the data link layer of the OSI basic reference model, extracts and records some pieces of information within packets at the layer 3 without performing packet capture of discarded frames, thus enabling failure analysis to be achieved.

Embodiment

Figure 1:
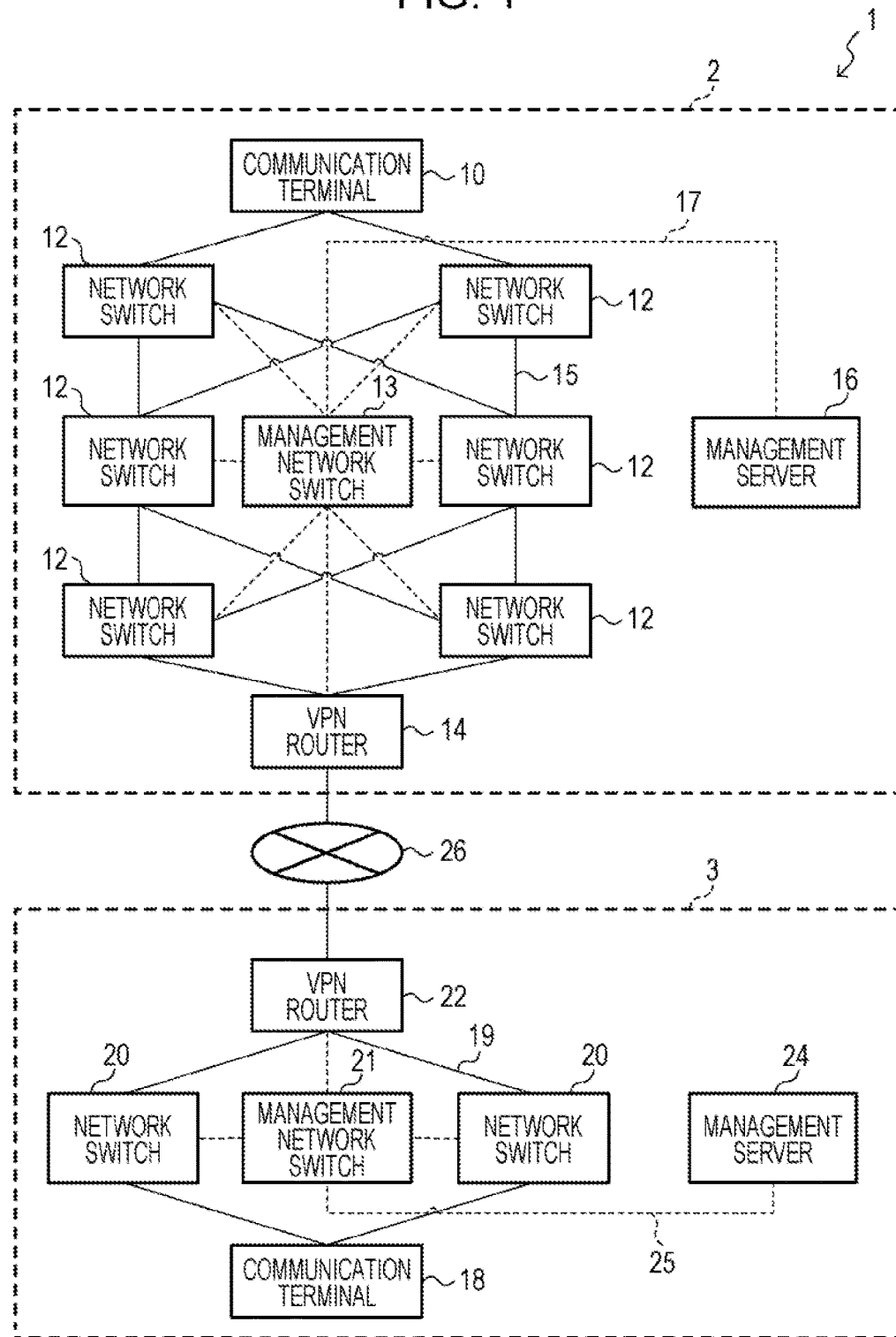
FIG. 1 is a diagram illustrating a configuration of a communication system according to an embodiment.

As illustrated in FIG. 1, a communication system 1 according to the present embodiment includes a data-center communication system 2 and a user-environment communication system 3.

The data-center communication system 2 includes a communication terminal 10, a plurality of network switches 12, a management network switch 13, a VPN router 14, and a management server 16. The communication terminal 10, the plurality of network switches 12, and the VPN router 14 are coupled with each other via a data-center network 15. In addition, the plurality of network switches 12, the management network switch 13, and the management server 16 are coupled with each other via a management network 17. Note that, although FIG. 1 illustrates only one communication terminal 10, the data-center communication system 2 includes a plurality of communication terminals 10.

The user-environment communication system 3 includes a communication terminal 18, a plurality of network switches 20, a management network switch 21, a VPN router 22, and a management server 24. The communication terminal 18, the plurality of network switches 20, and the VPN router 22 are coupled with each other via a user-environment network 19. The plurality of network switches 20, the management network switch 21, and the management server 24 are coupled with each other via a management network 25. The network switches 12 and 20 are examples of a relay apparatus, and the management servers 16 and 24 are examples of a management device. Note that, although FIG. 1 illustrates only one communication terminal 18, the user-environment communication system 3 includes a plurality of communication terminals 18.

The data-center communication system 2 and the user-environment communication system 3 are coupled with each other via the Internet 26. Therefore, the communication terminal 10 and the communication terminal 18 are coupled with each other via a plurality of network switches and VPN routers. In addition, transmission and reception of data between the communication terminal 10 and the communication terminal 18 is performed via the management network 17, the management network 25, and the Internet 26.

Hereinafter, each component of the data-center communication system 2 will be described. In the present embodiment, the case where the network switches 12 record information about a frame (hereinafter referred to as a discard frame) that is to be discarded will be described.

Figure 2:
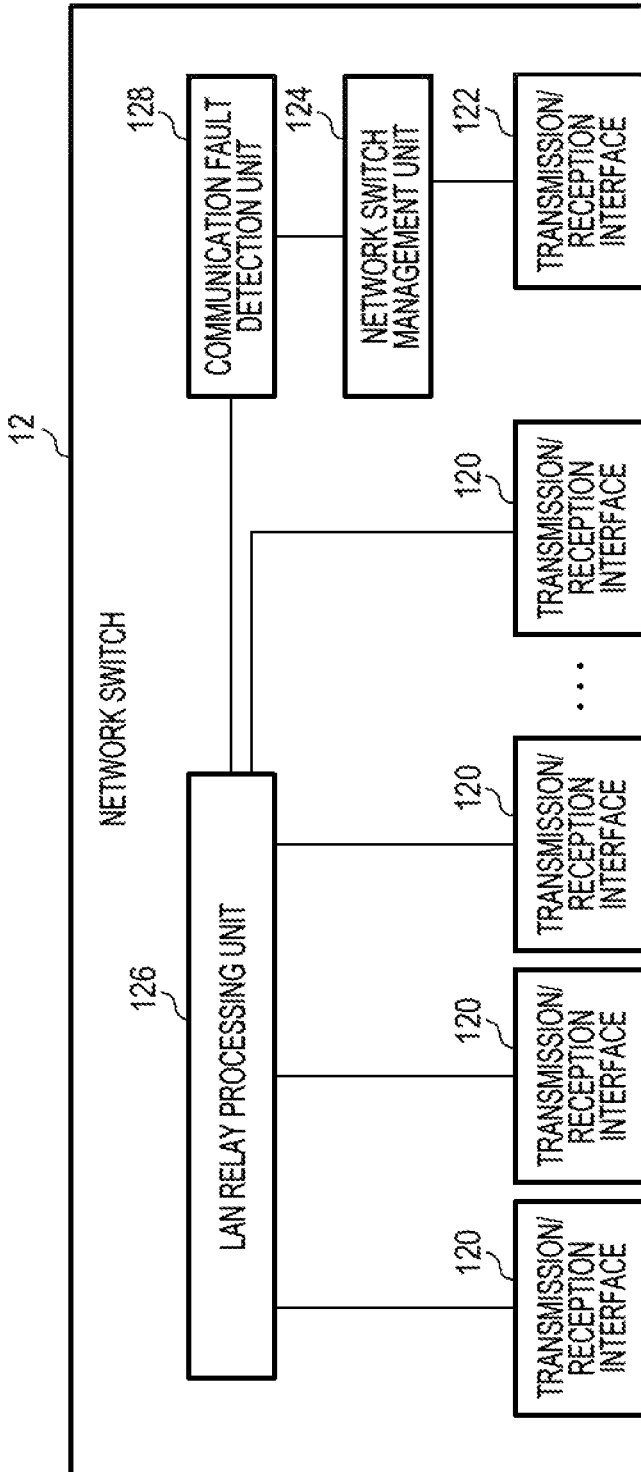
FIG. 2 is a diagram illustrating a functional configuration of a network switch according to an embodiment.

As illustrated in FIG. 2, the network switch 12 includes a plurality of transmission/reception interfaces 120, a transmission/reception interface 122, a network switch management unit 124, a local area network (LAN) relay processing unit 126, and a communication fault detection unit 128.

The transmission/reception interface 120 receives a frame transmitted from a communication device (for example, another network switch 12, the VPN router 14, or the communication terminal 10 serving as an example of a first device) which is directly coupled therewith via a communication line. The transmission/reception interface 120 also transmits a frame to a communication device (for example, another network switch 12, the VPN router 14, or the communication terminal 10 serving as an example of a second device) which is directly coupled therewith via a communication line.

The transmission/reception interface 122 receives operational data transmitted from the management server 16. The operational data includes information indicating "record start" or "record stop" of information about a discard frame, extraction condition data representing conditions for recording information about a discard frame, and read condition data representing information about a discard frame that is to be read.

The network switch management unit 124 acquires operational data received by the transmission/reception interface 122 and outputs the operational data to the communication fault detection unit 128.

The LAN relay processing unit 126 acquires a frame received by the transmission/reception interface 120 and determines whether to transfer or discard this frame. The LAN relay processing unit 126 transfers a frame to be transferred (a frame determined not to be discarded) via the transmission/reception interface 120. The LAN relay processing unit 126 outputs a discard frame and information about the discard frame to the communication fault detection unit 128.

Figure 3:
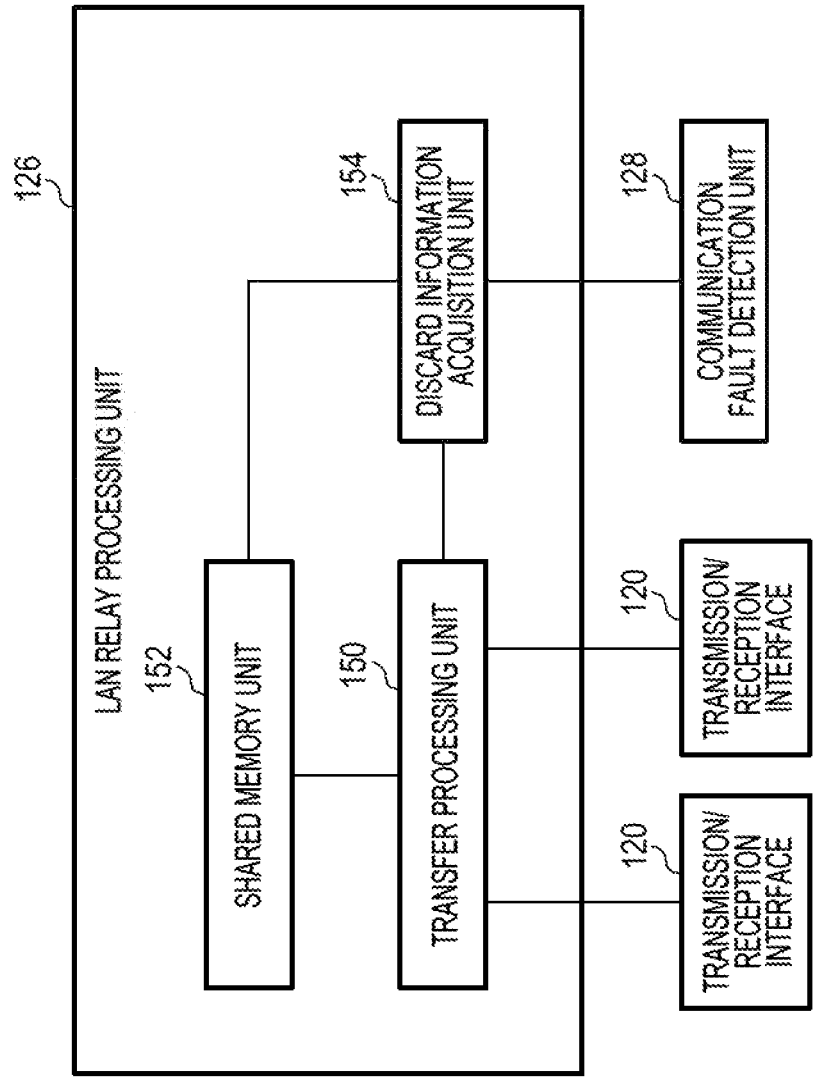
FIG. 3 is a diagram illustrating an example of a configuration of a LAN relay processing unit of a network switch.

As illustrated in FIG. 3, the LAN relay processing unit 126 includes a transfer processing unit 150, a shared memory unit 152, and a discard information acquisition unit 154. The LAN relay processing unit 126 is an example of a relay processing unit.

The transfer processing unit 150 acquires frames received by the transmission/reception interface 120 and sequentially stores the frames in the shared memory unit 152. The transfer processing unit 150 also determines whether to transfer or discard a received frame.

For example, upon receiving a frame whose form is faulty, such as a frame for which the destination is not set, or a frame whose frame length exceeds a value defined as the length of an Ethernet (registered trademark) frame, the transfer processing unit 150 determines to discard the received frame. The transfer processing unit 150 generates a discard reason code representing a reason for determining that the frame in question is a discard frame. When discarding a frame to be relayed, the transfer processing unit 150 stores the discard frame, the reception time of the discard frame, information on a reception port of the discard frame, and the discard reason code for the discard frame in association with one another in the shared memory unit 152.

Further, the transfer processing unit 150 stores a normal frame, as a frame to be transmitted, in the shared memory unit 152.

Here, the frame to be transmitted is controlled in a queue of a linked list structure in which frames are linked for each destination port by using pointers. Typically, when a frame is discarded, the pointer to this frame is deleted.

The transfer processing unit 150 links the pointer to a frame to be discarded, to a discard frame queue, and outputs the discard frame queue.

Based on the destination of a frame to be transmitted, which is stored in the shared memory unit 152, the transfer processing unit 150 transfers the frame to be transmitted, via the transmission/reception interface 120 corresponding to the destination port.

In the shared memory unit 152, a frame received by the transmission/reception interface 120 is stored. In addition, in the shared memory unit 152, a frame to be transmitted and a discard frame are stored. The discard frame is stored in such a manner that the discard reason code is associated therewith. In the shared memory unit 152, the reception time and information on the reception port of each frame are stored in association with the frame.

The discard information acquisition unit 154 acquires the discard frame queue output from the transfer processing unit 150. Then, based on the acquired discard frame queue, the discard information acquisition unit 154 reads a discard frame and information about the discard frame, which includes the reception time of the discard frame, the discard reason code of the discard frame, and information on the reception port, from the shared memory unit 152. The discard information acquisition unit 154 then outputs the discard frame and the information about the discard frame to the communication fault detection unit 128.

The communication fault detection unit 128 acquires the discard frame and information about the discard frame output from the LAN relay processing unit 126. The communication fault detection unit 128 then extracts, from a packet contained in the discard frame, a transmission source internet protocol (IP) address and a destination IP address, which are examples of given information, and outputs the transmission source IP address and the destination IP address. In addition, the communication fault detection unit 128 acquires operational data output from the network switch management unit 124, and writes and reads information about the discard frame in accordance with the operational data.

Figure 4:
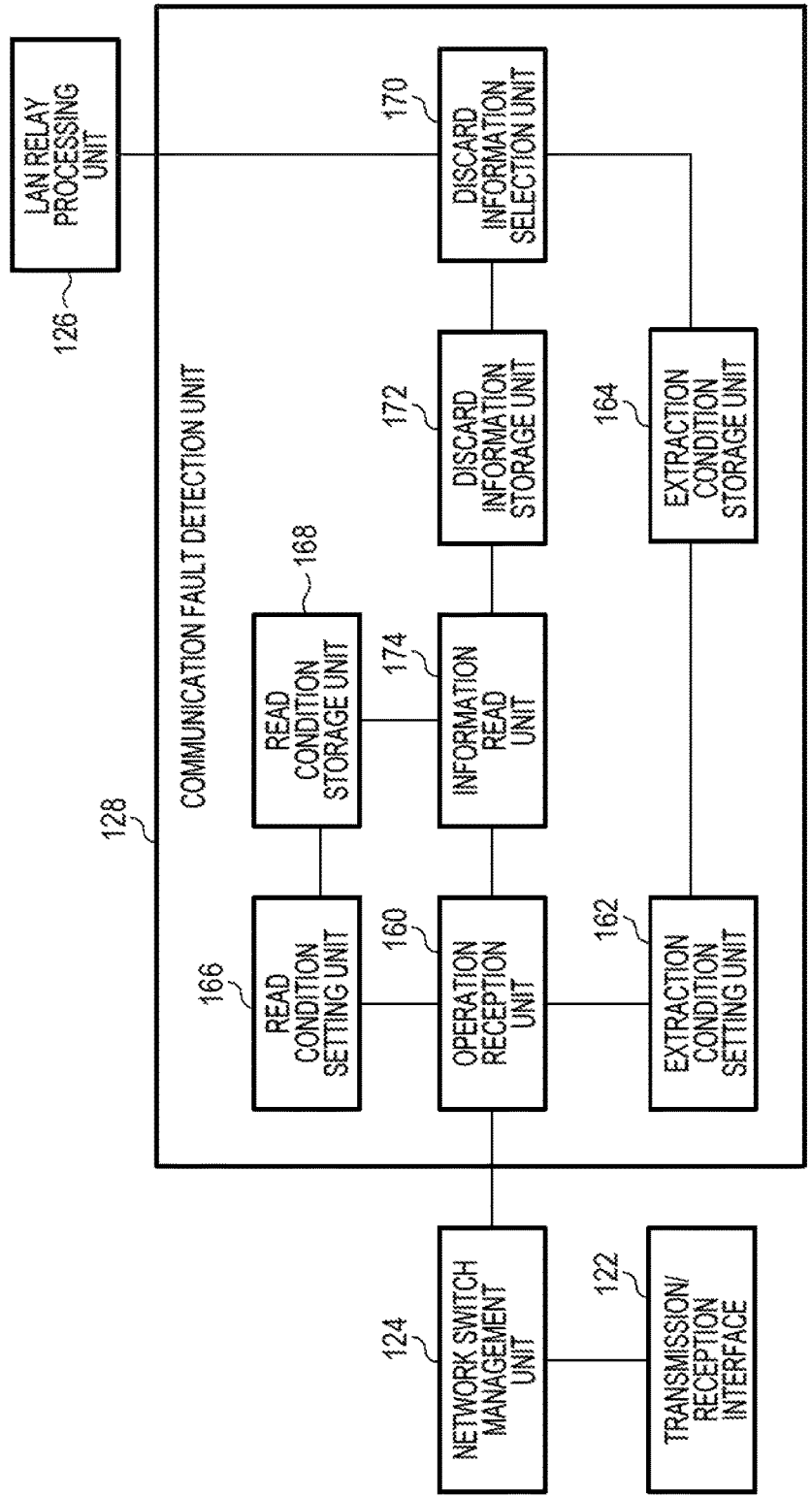
FIG. 4 is a diagram illustrating an example of a configuration of a communication fault detection unit of a network switch.

As illustrated in FIG. 4, the communication fault detection unit 128 includes an operation reception unit 160, an extraction condition setting unit 162, an extraction condition storage unit 164, a read condition setting unit 166, a read condition storage unit 168, a discard information selection unit 170, a discard information storage unit 172, and an information read unit 174.

The operation reception unit 160 acquires operational data output from the network switch management unit 124.

The extraction condition setting unit 162 acquires information for instructing to start recording or to stop recording of information about a discard frame, and extraction condition data, from the operational data received by the operation reception unit 160. The extraction condition setting unit 162 stores, for example, a transmission source IP address and a destination IP address included in the extraction condition data, as extraction conditions, in the extraction condition storage unit 164. The extraction condition setting unit 162 also stores the information for instructing to start recording or to stop recording of information about a discard frame, as a discard information sampling flag, in the extraction condition storage unit 164.

Note that, both, either, or neither of the transmission IP address and the destination IP address may be included in the extraction condition data.

In the extraction condition storage unit 164, extraction condition data is stored as a table. FIG. 5 illustrates an example of an extraction condition data table 510 stored in the extraction condition storage unit 164. In the extraction condition data table 510, for example, a transmission source IP address, a destination IP address, and a discard information sampling flag are stored in association with one another. The transmission source IP address represents the IP address of a communication terminal from which a frame has been transmitted, and the destination IP address represents the IP address of a communication terminal serving as the destination to which the frame will be transferred. The discard information sampling flag indicates whether to stop recording or to start recording of information about a discard frame, which is output from the LAN relay processing unit 126. If the discard information sampling flag is "0", it is indicated that information about a discard frame that satisfies the extraction conditions in question is discarded without being extracted and stored by the discard information selection unit 170 described below. If the discard information sampling flag is "1", it is indicated that information about a discard frame that satisfies the extraction conditions in question is extracted and stored by the discard information selection unit 170 described later.

The read condition setting unit 166 acquires read condition data from operational data received by the operation reception unit 160. The read condition setting unit 166 stores, for example, time information and IP address information included in the read condition data, as read conditions, into the read condition storage unit 168.

The read condition storage unit 168 stores therein, for example, time information and IP address information, as read conditions. The time information represents the range of time at which a discard frame to be read is received, and information about a discard frame that matches the time information is read by the information read unit 174 described later. The IP address information includes at least one of the transmission source IP address or the destination IP address, and information about a discard frame that matches the IP address information is read by the information read unit 174 described later. Note that both, either, or neither of the transmission source IP address and the destination IP address may be included in the read conditions. The extraction conditions and the read conditions are examples of a condition set in advance.

Figure 6:
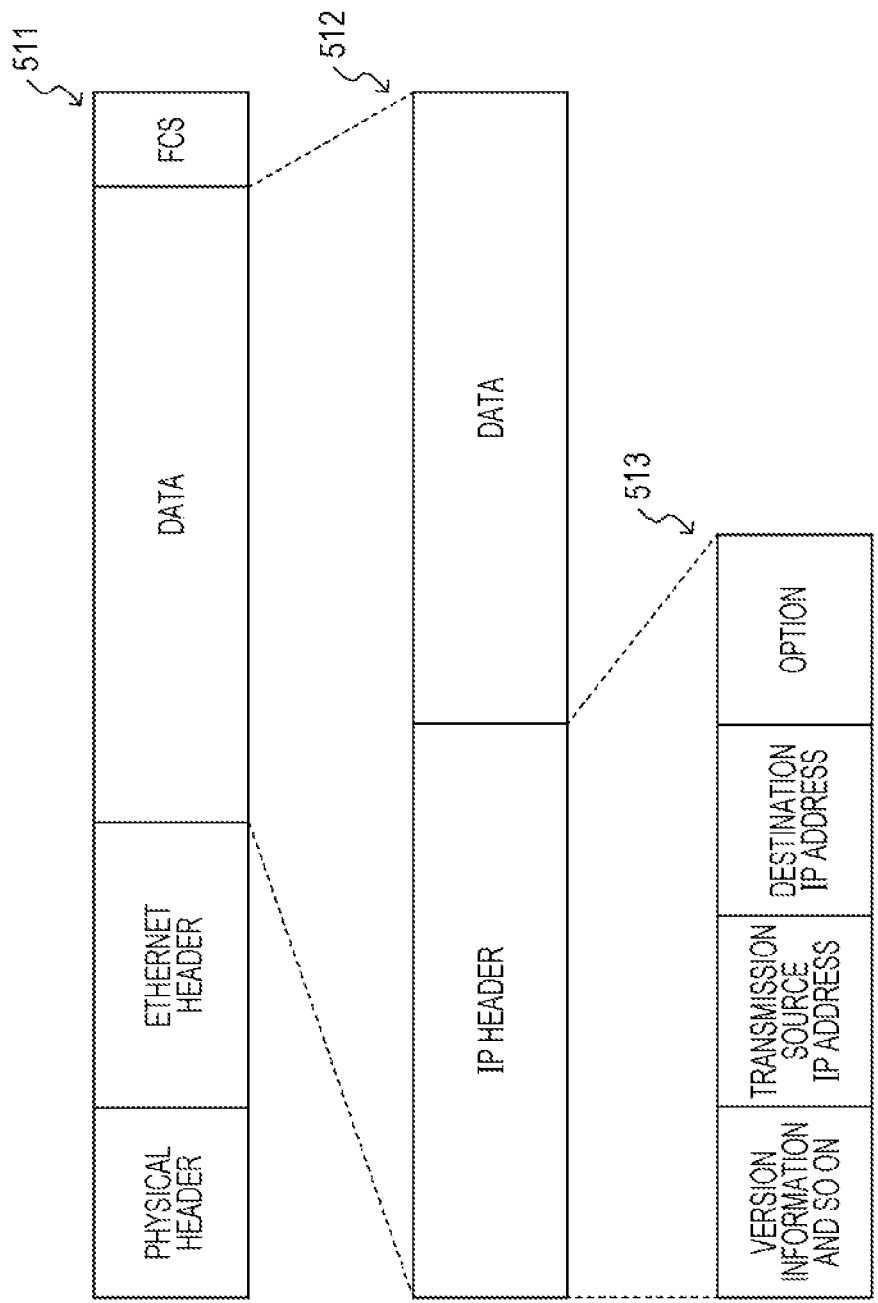
FIG. 6 is a diagram illustrating an example of a structure of a frame.

Here, the structure of a frame will be described. As illustrated in FIG. 6, an Ethernet (registered trademark) frame 511 is transferred in such a manner that information is prepended and appended to an IP packet 512. The IP packet 512 is an example of second information, and the information prepended and appended to the IP packet 512 is an example of first information. Generally, in communication at the layer 2, based on information of an Ethernet (registered trademark) frame header, a frame is transferred to a device set as the destination in the Ethernet (registered trademark) header, and a frame determined to be in a faulty form and a frame determined to have no transfer destination are discarded. The transmission source IP address and the destination IP address of a discard frame is read from an IP header 513.

Figure 7:
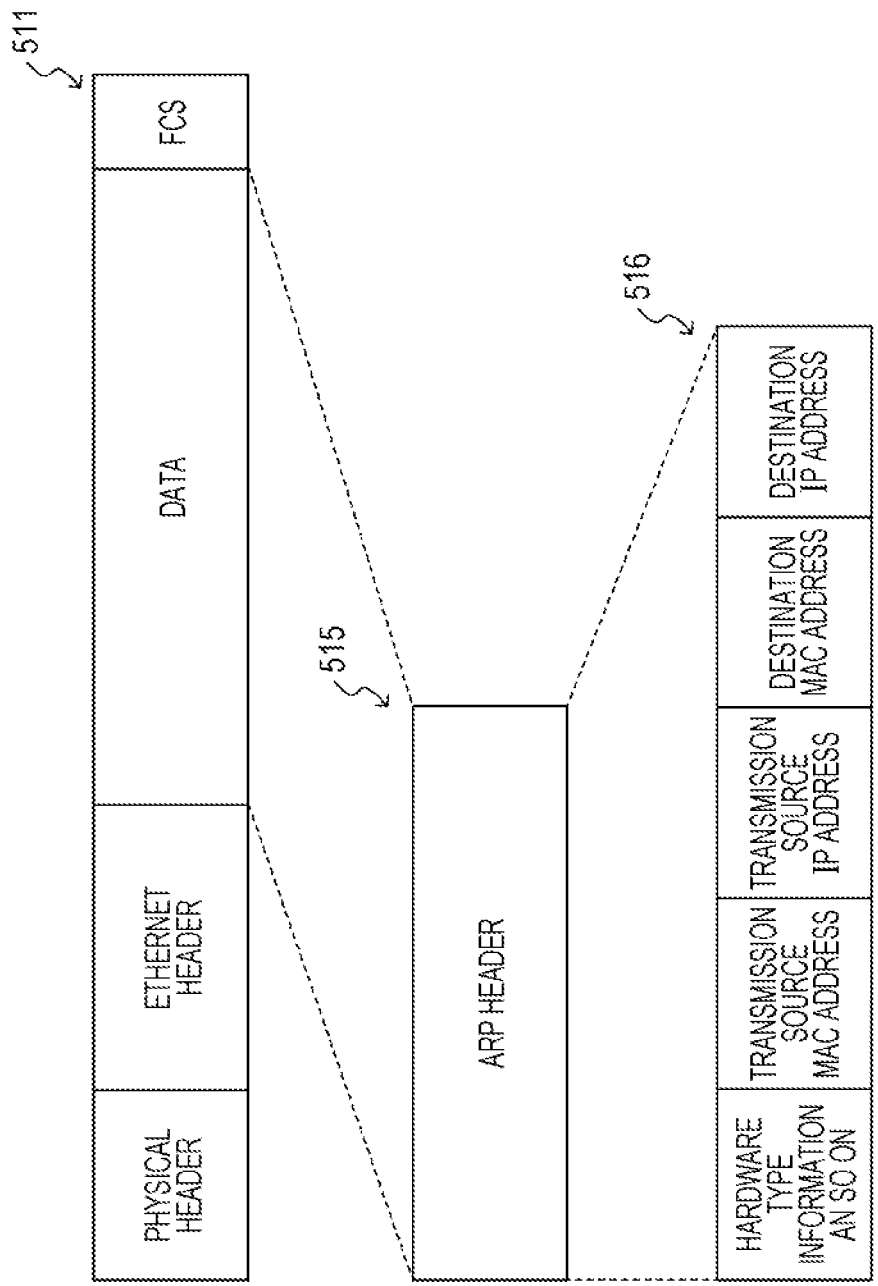
FIG. 7 is a diagram illustrating an example of a structure of a frame.

In the present embodiment, the Ethernet (registered trademark) is described as a protocol at the data link layer, which is an example of a first communication layer. In addition, in the present embodiment, the Internet protocol is described as a protocol at the network layer, which is an example of a second communication layer. However, the protocol is not limited to the Internet protocol as long as it is a protocol for which, for example, a transmission source address, a destination address, and the like may be acquired from the corresponding information. By way of example, as illustrated in FIG. 7, an address resolution protocol (ARP) packet 515 compliant with the ARP contains a transmission source address and a destination address in an ARP header 516 and thus may be processed as is the case with the IP packet 512.

The discard information selection unit 170 acquires information about a discard frame transferred from the LAN relay processing unit 126. The discard information selection unit 170 reads a transmission source IP address, a destination IP address, and a discard information sampling flag from the extraction condition data table stored in the extraction condition storage unit 164. The communication fault detection unit 128 is an example of an output unit.

If the discard information sampling flag is "0", the discard information selection unit 170 does not sample but discards the discard frame and information about the discard frame transferred from the LAN relay processing unit 126.

If the discard information sampling flag is "1", the discard information selection unit 170 samples the discard frame and information about the discard frame transferred from the LAN relay processing unit 126.

Upon sampling the discard frame and the information about the discard frame, the discard information selection unit 170 verifies the integrity of the acquired discard frame. The discard information selection unit 170 verifies that the integrity is present, for example, when the frame length of the frame has not changed and the recalculated result of a checksum for the frame equals the frame check sequence (FCS) of the frame. Thus, it is verified that the frame is not deficient and the content of the frame has not changed.

If, for example, a discard frame is deficient, the discard information selection unit 170 stores, the time stamp indicating the reception time, the discard reason code, and information on the reception port among information about the discard frame, and the frame length of the discard frame in the discard information storage unit 172.

Reasons why a discard frame is deficient are that, for example, the frame is not normally received or only part of the frame is received, because of the loss of the FCS or buffer depletion. The discard information selection unit 170 discards the discard frame.

If the discard frame is not deficient, the discard information selection unit 170 performs the following processing.

First, the discard information selection unit 170 reads the IP header from the discard frame. Then, if the transmission source IP address in the extraction conditions and the transmission source IP address in the IP header are not equal, the discard information selection unit 170 discards the discard frame. In addition, if the destination IP address in the extraction conditions and the destination IP address in the IP header are not equal, the discard information selection unit 170 discards the discard frame.

If the transmission source IP address in the extraction conditions and the transmission source IP address in the IP header are equal and the destination IP address in the extraction conditions and the destination IP address in the IP header are equal, the discard information selection unit 170 stores information about the discard frame in the discard information storage unit 172.

Specifically, the discard information selection unit 170 stores the time stamp indicating the reception time, the transmission source IP address, the destination IP address, the discard reason code, information on the reception port, and the frame length in the discard information storage unit 172, and discards the discard frame.

In the discard information storage unit 172, a discard information record data table is stored. FIG. 8 illustrates an example of a discard information record data table when the IP address is an Internet protocol version 4 (IPv4) address. As illustrated in FIG. 8, in a discard information record data table 520, a time stamp indicating a reception time, a transmission source IP address, a destination IP address, a discard reason code, a frame length, and a reception port number are stored. In the column of the discard reason code, a code indicating a reason for discarding, which is displayed as statistical information, is stored. In the column of the frame length, the size of a discard frame is stored in byte. In the column of the reception port number, the port number of a transmission/reception interface through which the frame in question is input is stored.

The transmission source IP address and the destination IP address may be in either form of IPv4 addresses and IPv6 addresses. FIG. 9 illustrates an example of a discard information record data table 521 when IPv6 addresses are used.

The information read unit 174 reads time information and IP address information stored in the read condition storage unit 168, reads information about a discard frame that matches the time information and the IP address information from the discard information storage unit 172, and outputs the information about the discard frame to the operation reception unit 160.

The operation reception unit 160 outputs the information about the discard frame output from the information read unit 174 to the network switch management unit 124. The network switch management unit 124 transmits the information about the discard frame via the transmission/reception interface 122 to the management server 16. Then, the information about the discard frame is displayed on a display unit of the management server 16.

Figure 10:
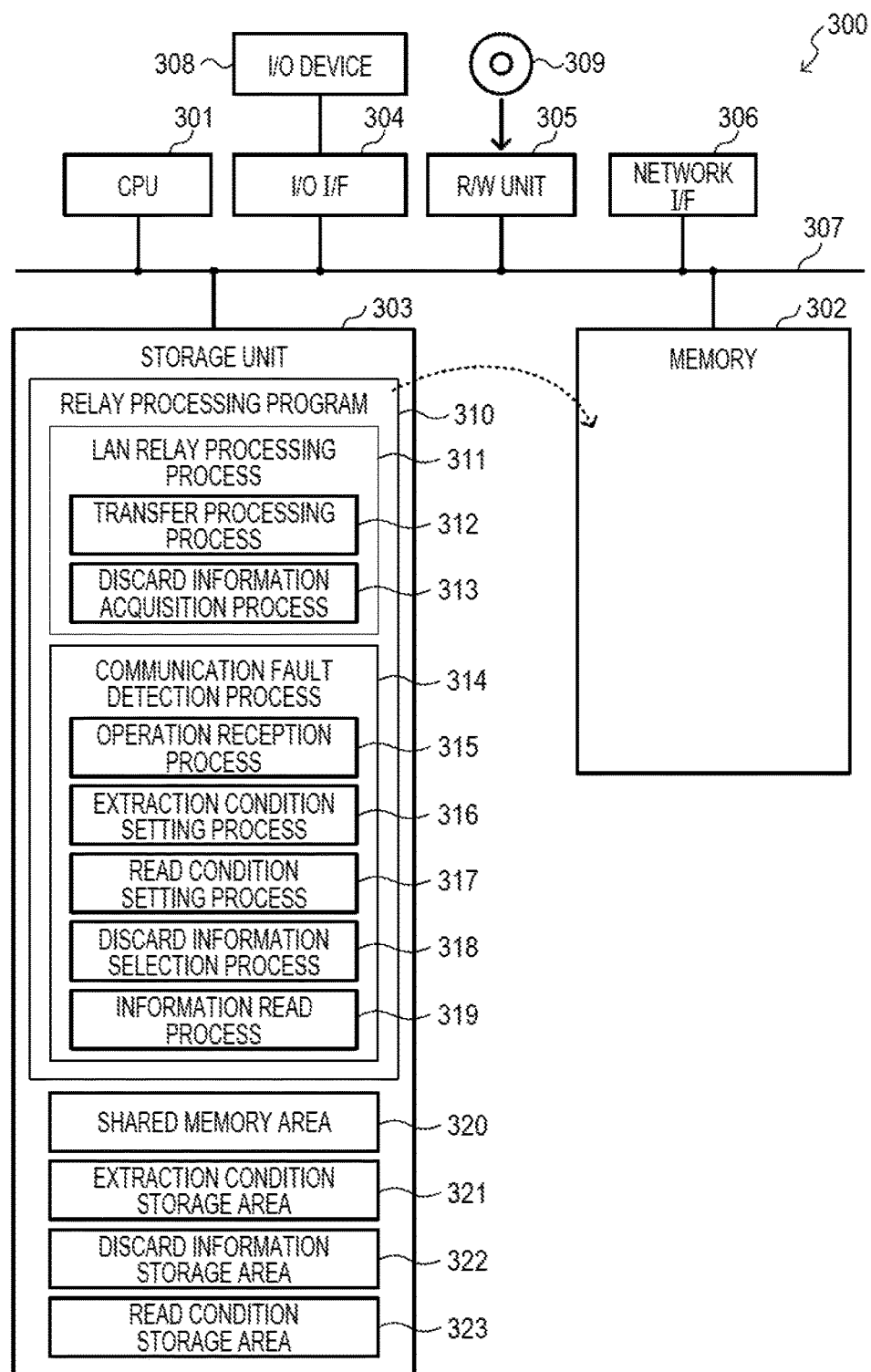
FIG. 10 is a diagram illustrating a configuration of a computer system of a network switch according to the embodiment.

The network switch 12 may be, for example, implemented by a computer 300 illustrated in FIG. 10. The computer 300 includes a central processing unit (CPU) 301, memory 302 serving as a temporary storage area, and a nonvolatile storage unit 303. The computer 300 also includes an input-output (I/O) interface (I/F) 304 with which an I/O device 308 such as a display device, an input device, and the like is coupled. The computer 300 also includes a read/write (R/W) unit 305 that controls reading and writing of data from and to a recording medium 309, and a network I/F 306 that is coupled with a network such as the Internet. The CPU 301, the memory 302, the storage unit 303, the I/O I/F 304, the R/W unit 305, and the network I/F 306 are coupled with one another via a bus 307.

The storage unit 303 may be implemented by a hard disk drive (HDD), a solid state drive (SSD), flash memory, or the like. In the storage unit 303, which is a storage medium, a relay processing program 310 for causing the computer 300 to function as the network switch 12 is stored. In addition, the storage unit 303 includes a shared memory area 320 where information constituting each table included in the shared memory unit 152 is stored, an extraction condition storage area 321 where information constituting each table included in the extraction condition storage unit 164 is stored, a discard information storage area 322 where information constituting each table included in the discard information storage unit 172 is stored, and a read condition storage area 323 where information constituting each table included in the read condition storage unit 168 is stored. The CPU 301 reads the relay processing program 310 from the storage unit 303 and loads the relay processing program 310 onto the memory 302, and sequentially executes processes included in the relay processing program 310. The CPU 301 also reads information from the shared memory area 320 and loads each table included in the shared memory unit 152 onto the memory 302. The CPU 301 also reads information from the extraction condition storage area 321 and loads each table included in the extraction condition storage unit 164 onto the memory 302. The CPU 301 also reads information from the discard information storage area 322 and loads each table included in the discard information storage unit 172 onto the memory 302. The CPU 301 also reads information from the read condition storage area 323 and loads each table included in the read condition storage unit 168 onto the memory 302.

The relay processing program 310 includes a LAN relay processing process 311 and a communication fault detection process 314. The LAN relay processing process 311 includes a transfer processing process 312 and a discard information acquisition process 313. The communication fault detection process 314 includes an operation reception process 315, an extraction condition setting process 316, a read condition setting process 317, a discard information selection process 318, and an information read process 319. The CPU 301 executes the LAN relay processing process 311 to operate as the LAN relay processing unit 126 illustrated in FIG. 3. The CPU 301 executes the transfer processing process 312 to operate as the transfer processing unit 150 illustrated in FIG. 3. The CPU 301 executes the discard information acquisition process 313 to operate as the discard information acquisition unit 154 illustrated in FIG. 3. The CPU 301 executes the communication fault detection process 314 to operate as the communication fault detection unit 128 illustrated in FIG. 4. The CPU 301 executes the operation reception process 315 to operate as the operation reception unit 160 illustrated in FIG. 4. The CPU 301 executes the extraction condition setting process 316 to operate as the extraction condition setting unit 162 illustrated in FIG. 4. The CPU 301 executes the read condition setting process 317 to operate as the read condition setting unit 166 illustrated in FIG. 4. The CPU 301 executes the discard information selection process 318 to operate as the discard information selection unit 170 illustrated in FIG. 4. The CPU 301 executes the information read process 319 to operate as the information read unit 174 illustrated in FIG. 4. Thus, the computer 300 executing the relay processing program 310 functions as the network switch 12.

Note that the features implemented by the relay processing program 310 may be implemented by, for example, a semiconductor integrated circuit, more particularly, an application specific integrated circuit (ASIC) or the like.

Next, with reference to FIG. 11 to FIG. 17, operations of the communication system 1 according to the present embodiment will be described.

Figure 11:
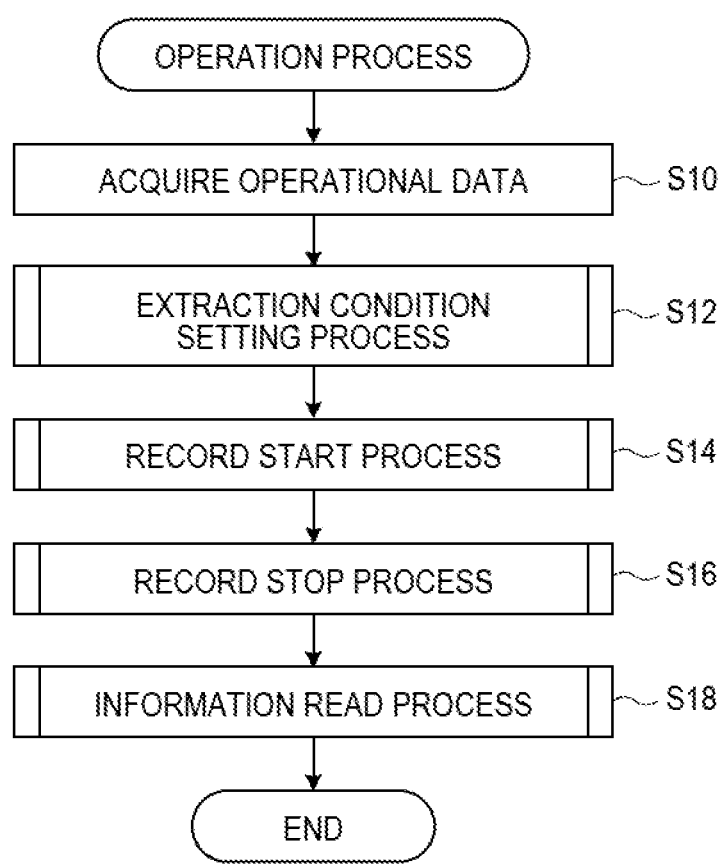
FIG. 11 is a flowchart illustrating an example of an operation process of a network switch.
Figure 12:
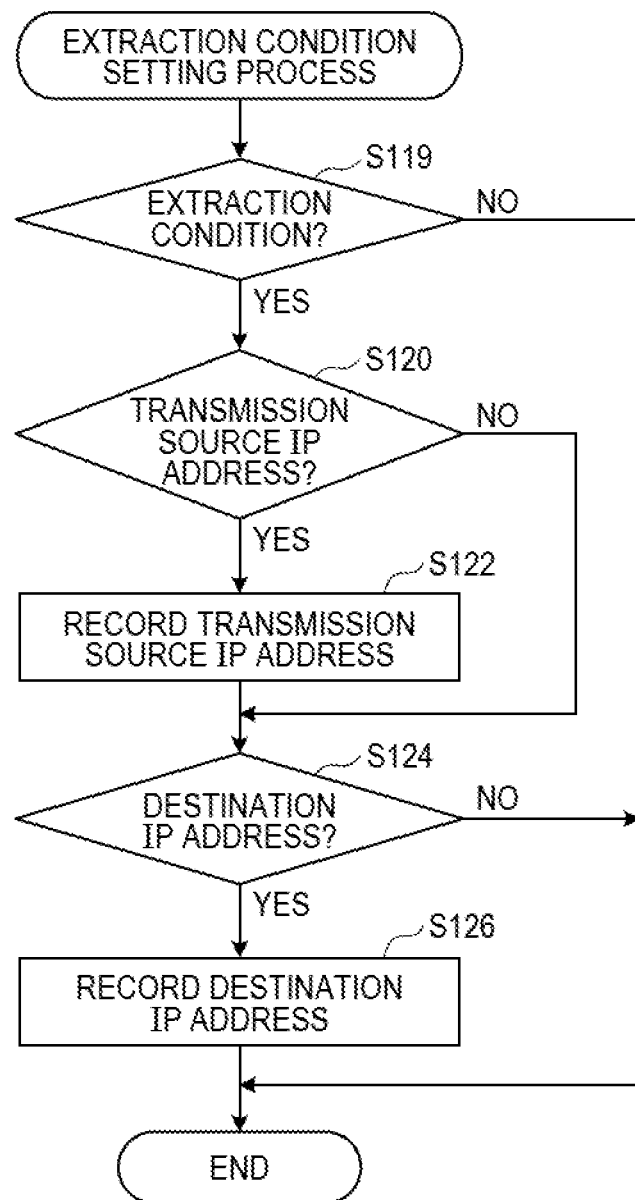
FIG. 12 is a flowchart illustrating an example of an extraction condition setting process of a network switch.
Figure 13:
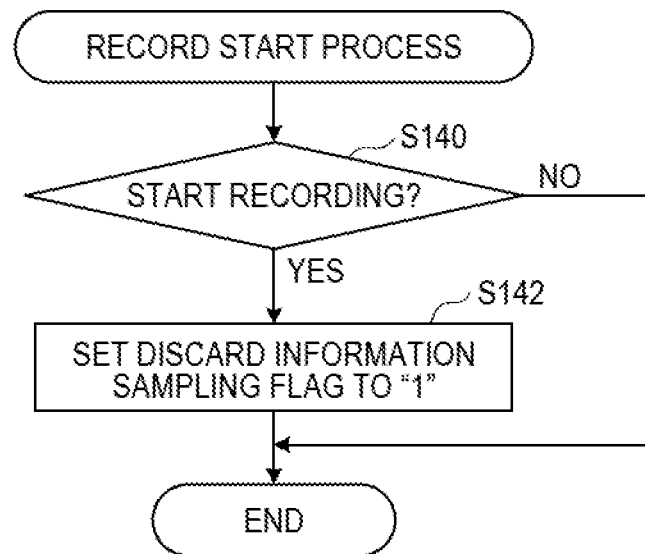
FIG. 13 is a flowchart illustrating an example of a record start process of a network switch.
Figure 14:
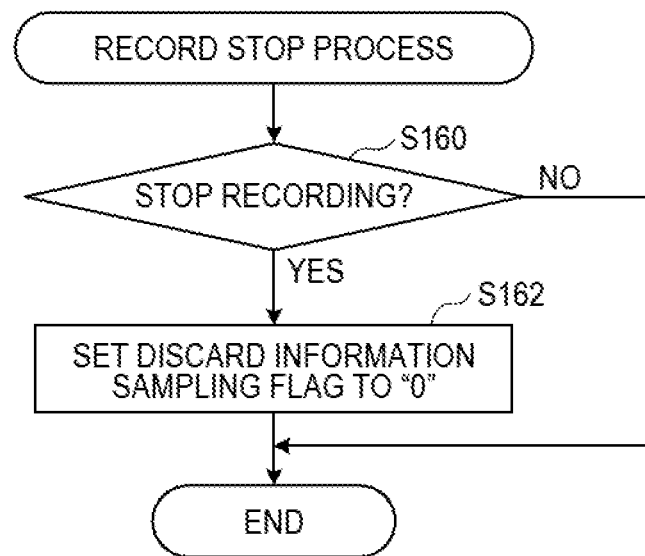
FIG. 14 is a flowchart illustrating an example of a record stop process of a network switch.
Figure 15:
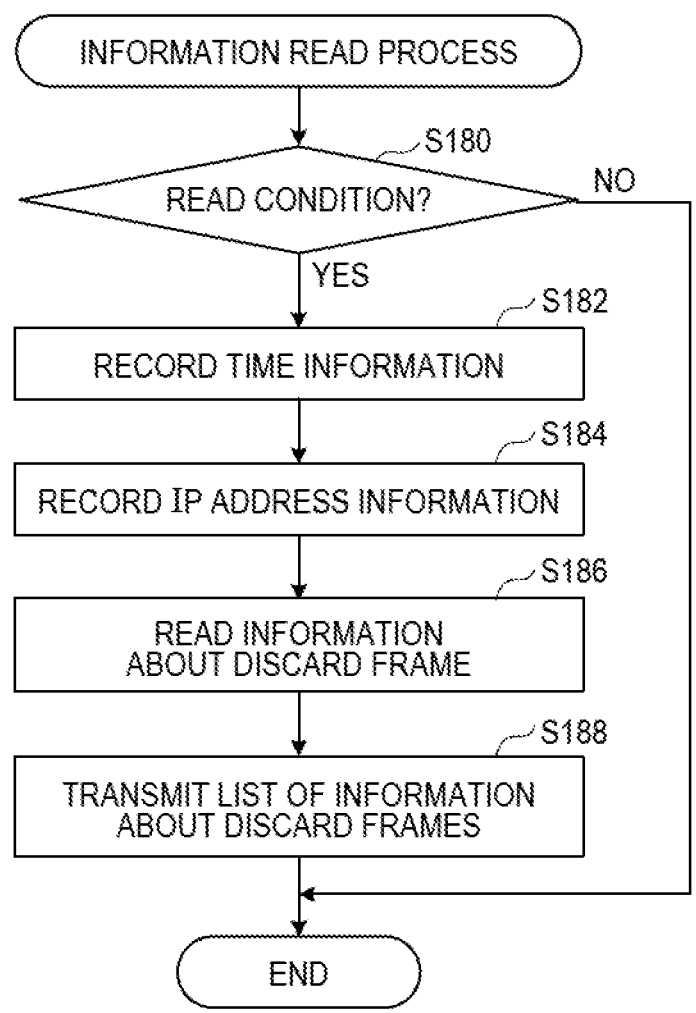
FIG. 15 is a flowchart illustrating an example of an information read process of a network switch.

FIG. 11 illustrates an example of a flow of an operation process executed by the network switch 12 when the network switch 12 receives operational data from the management server 16.

Operational data is transmitted from the management server 16, and the transmission/reception interface 122 of the network switch 12 receives the operational data. When the network switch management unit 124 acquires the operational data received by the transmission/reception interface 122 and outputs the operational data to the communication fault detection unit 128, an operation process routine illustrated in FIG. 11 is performed.

In S10, the operation reception unit 160 acquires the operational data output from the network switch management unit 124.

In S12, the extraction condition setting unit 162 sets extraction conditions on the basis of the operational data acquired in S10. S12 is implemented by an extraction condition setting process routine illustrated in FIG. 12.

In S119, the extraction condition setting unit 162 determines whether or not extraction condition data is included in the operational data acquired in S10. If extraction condition data is included in the operational data, the routine proceeds to S120. If extraction condition data is not included in the operational data, the extraction condition setting process routine terminates.

In S120, the extraction condition setting unit 162 determines whether or not a transmission source IP address is present in extraction condition data included in the operational data acquired in S10. If a transmission source IP address is present in the extraction condition data, the routine proceeds to S122. If no transmission source IP address is present in the extraction condition data, the routine moves to S124.

In S122, the extraction condition setting unit 162 stores the transmission source IP address included in the extraction condition data into the transmission source IP address column of the extraction condition data table in the extraction condition storage unit 164.

In S124, the extraction condition setting unit 162 determines whether or not a destination IP address is present in the extraction condition data included in the operational data acquired in S10. If a destination IP address is present in the extraction condition data, the routine proceeds to S126. If no destination IP address is present in the extraction condition data, the extraction condition setting process routine terminates.

In S126, the extraction condition setting unit 162 stores the destination IP address included in the extraction condition data into the destination IP address column of the extraction condition data table in the extraction condition storage unit 164.

Next, returning to the operation process routine illustrated in FIG. 11, in S14, the extraction condition setting unit 162 performs a process (record start process) of starting to record information about a discard frame. S14 is implemented by a record start process routine illustrated in FIG. 13.

In S140, the extraction condition setting unit 162 determines whether or not information for instructing to start recording for a discard frame that matches extraction condition data is included in the operational data acquired in S10. If information for instructing to start recording for a discard frame that matches the extraction condition data is included, the routine proceeds to S142. If no information for instructing to start recording for a discard frame that matches the extraction condition data is included, the record start process routine terminates.

In S142, the extraction condition setting unit 162 sets the discard information sampling flag in the extraction condition data table to "1" and terminates the record start process routine.

Next, returning to the operation process routine illustrated in FIG. 11, in S16, the extraction condition setting unit 162 performs a process (record stop process) to stop recording of information about a discard frame. S16 is implemented by a record stop process routine illustrated in FIG. 14.

In S160, the extraction condition setting unit 162 determines whether or not information for instructing to stop recording of information about a discard frame that matches extraction condition data is included in the operational data acquired in S10. If information for instructing to stop recording of information about a discard frame that matches extraction condition data is included, the routine proceeds to S162. If no information for instructing to stop recording of information about a discard frame that matches extraction condition data is included, the record stop process routine terminates.

In S162, the extraction condition setting unit 162 sets the discard information sampling flag in the extraction condition data table to "0", and terminates the record stop process routine.

Next, returning to the operation process routine illustrated in FIG. 11, in S18, the read condition setting unit 166 sets read conditions on the basis of the operational data received by the operation reception unit 160. The information read unit 174 reads information about a discard frame in accordance with the set read conditions. S18 is implemented by an information read process routine illustrated in FIG. 15.

In S180, the read condition setting unit 166 determines whether or not read condition data is included in the operational data acquired in S10. If read condition data is included in the operational data, the routine proceeds to S182. If no read condition data is included in the operational data, the information read process routine terminates.

In S182, the read condition setting unit 166 stores time information included in the read condition data into the read condition storage unit 168.

In S184, the read condition setting unit 166 stores IP address information included in the read condition data into the read condition storage unit 168.

In S186, the information read unit 174 reads the time information and the IP address information stored in the read condition storage unit 168, and reads information about a discard frame that matches the time information and the IP address, from the discard information storage unit 172.

In S188, the operation reception unit 160 outputs a list of information about discard frames output from the information read unit 174 to the network switch management unit 124. The network switch management unit 124 transmits the list of information about discard frames via the transmission/reception interface 122 to the management server 16.

The list of information about discard frames is then displayed on a display unit of the management server 16.

Figure 16:
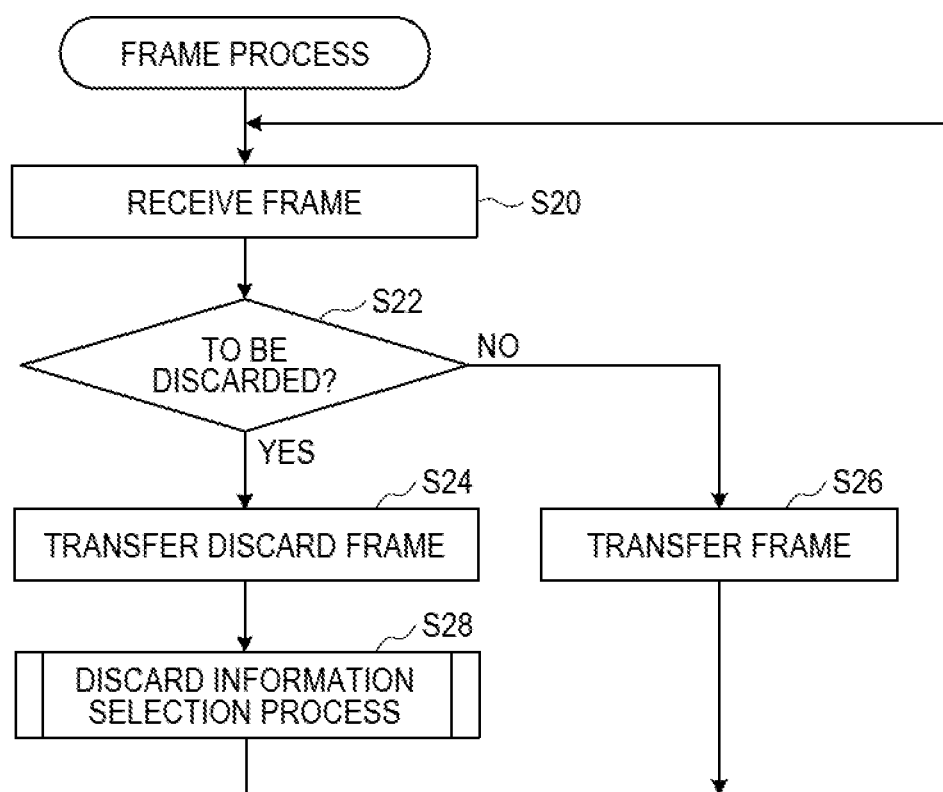
FIG. 16 is a flowchart illustrating an example of a frame process of a network switch.
Figure 17:
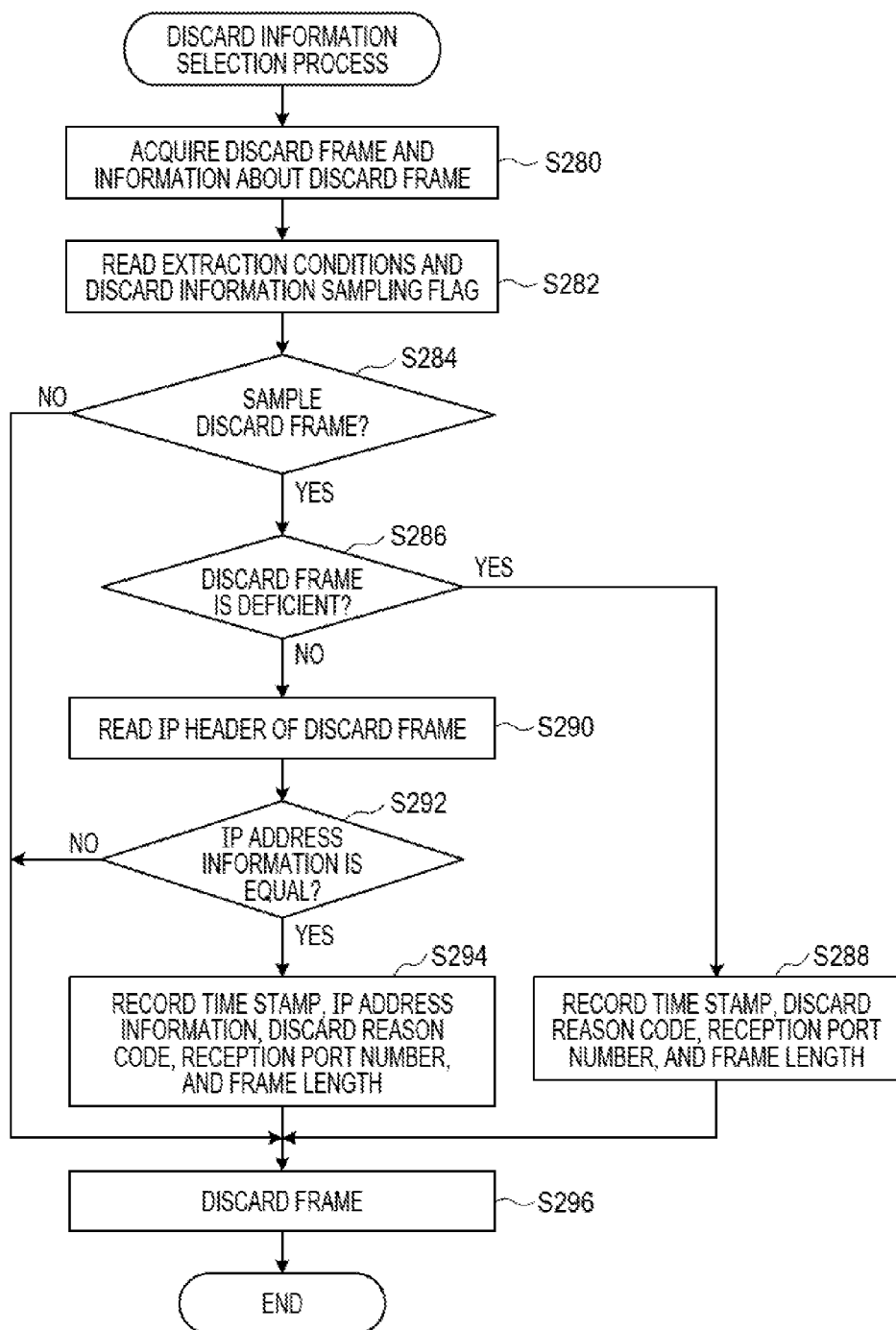
FIG. 17 is a flowchart illustrating an example of a discard information selection process of a network switch.

FIG. 16 illustrates an example of a flow of a frame process performed by the network switch 12 when a frame has been transmitted from the communication terminal 18 to the communication terminal 10, and the network switch 12 has received this frame.

For example, when a frame is transmitted from the communication terminal 18 to the communication terminal 10, and the network switch 12 receives the frame transmitted from the communication terminal 18, a frame process routine illustrated in FIG. 16 is performed.

First, in S20, the transmission/reception interface 120 receives a frame transmitted from the communication terminal 18.

In S22, the transfer processing unit 150 acquires the frame received by the transmission/reception interface 120 and determines whether to transfer or discard this frame. If the transfer processing unit 150 determines that the frame is to be transferred, the transfer processing unit 150 stores the frame, as a frame to be transferred, in the shared memory unit 152, and the routine proceeds to S26.

If the transfer processing unit 150 determines that the frame is to be discarded, the transfer processing unit 150 stores the discard frame, the reception time of the discard frame, information on the reception port of the discard frame, and the discard reason code for the discard frame in association with one another in the shared memory unit 152. The transfer processing unit 150 links the pointer to the frame to be discarded to a discard frame queue and outputs the discard frame queue, and the routine proceeds to S24.

In S24, the discard information acquisition unit 154 acquires the discard frame queue output in S22. Based on the acquired discard frame queue, the discard information acquisition unit 154 reads a discard frame and information about the discard frame including the reception time of the discard frame, the discard reason code for the discard frame, and information on the reception port, from the shared memory unit 152. The discard information acquisition unit 154 then outputs the information about the discard frame to the communication fault detection unit 128.

In S26, the transfer processing unit 150 transfers the frame to be transferred, stored in the shared memory unit 152, via the transmission/reception interface 120, and the routine returns to S20.

In S28, the communication fault detection unit 128 acquires the discard frame and information about the discard frame output in S24, and performs storing and reading of the information about the discard frame. S28 is implemented by a discard information selection process routine illustrated in FIG. 17.

In S280, the discard information selection unit 170 acquires a discard frame and information about the discard frame transferred from the LAN relay processing unit 126.

In S282, the discard information selection unit 170 reads a transmission source IP address, a destination IP address, and a discard information sampling flag stored in the extraction condition storage unit 164.

In S284, in accordance with the discard information sampling flag read in S282, the discard information selection unit 170 determines whether or not to sample the discard frame and the information about the discard frame acquired in S280. If the discard information sampling flag is "1", the discard information selection unit 170 determines to sample the discard frame and the information about the discard frame, and the routine proceeds to S286. If the discard information sampling flag is "0", the discard information selection unit 170 determines not to sample the discard frame and the information about the discard frame, and the routine proceeds to S296.

In S286, the discard information selection unit 170 verifies the integrity of the discard frame acquired in S280, and determines whether or not the discard frame is deficient. If it is determined that the discard frame is deficient, the routine proceeds to S288. If it is determined that the discard frame is not deficient, the routine proceeds to S290.

In S288, the discard information selection unit 170 stores the time stamp indicating the reception time, the discard reason code, and information on the reception port, and the frame length of the discard frame in the discard information storage unit 172.

In S290, the discard information selection unit 170 reads the IP header from the discard frame.

In S292, the discard information selection unit 170 determines whether or not information on the IP addresses in the extraction conditions, which is read in S282, is equal to the IP addresses in the IP header read in S290. If the information on the IP addresses in the extraction conditions is equal to the IP addresses in the IP header, the routine proceeds to S294. If the IP address information in the extraction conditions is not equal to the IP addresses in the IP header, the routine proceeds to S296.

In S294, the discard information selection unit 170 stores the time stamp indicating the reception time of the discard frame, the transmission source IP address, the destination IP address, information on the reception port, and the frame length of the discard frame in the discard information storage unit 172.

In S296, the discard information selection unit 170 discards the discard frame, and terminates the discard information selection process routine.

Next, with reference to a sequence diagram illustrated in FIG. 18 and FIG. 19, the flow of a process performed between the management server 16 and the network switches 12 will be described.

In the example illustrated in FIG. 18 and FIG. 19, the case where a plurality of network switches 12 record information about a discard frame, and the information about the discard frame is transmitted via the management network switch 13 to the management server 16 will be described.

Specifically, when a communication fault between the communication terminal 10 and the communication terminal 18 is detected, a failure in a communication terminal, a trouble in network setting, a failure in a network switch, and the like are checked first. However, if these faults are not detected, an attempt is made, by using the network switches 12, to detect a location where information to be transmitted and received between the communication terminal 10 and the communication terminal 18 is discarded as a discard frame. In the example given below, operations of a network administrator who operates the management server 16 of the data-center communication system 2 will be mainly described.

First, with reference to FIG. 18, the flow of processing performed when recording of discard frames is started without setting extraction conditions will be described.

In cases such as the case where a communication fault that occurs is unknown, first, in S30, before a communication fault is detected, an instruction to start recording is issued from the management server 16 to each network switch 12 without setting extraction conditions given from the management server to each network switch 12. "Without setting extraction conditions" means that specific IP addresses are not defined as extraction conditions.

Setting of extraction conditions and setting of record start and record stop processes are more effective when the network switches 12 are registered in the management server 16 and the setting of the conditions and the setting of the processes are combined with a program that concurrently performs the setting for a plurality of network switches 12.

In S40, upon detecting a communication fault in a network switch 12, the network switch 12 transmits information representing the communication fault to the management server 16. The management server 16 receives the information representing the communication fault.

In S50, the network administrator confirms the information representing the communication fault received by the management server 16. The network administrator sets read conditions that are to be given from the management server 16 to each network switch 12, and the management server 16 transmits the read condition data to each network switch 12. Each network switch 12 receives the read condition data. Conditions set as the read conditions are time conditions prior to and subsequent to the time at which the communication fault is detected, and the IP addresses of the communication terminal 10 and the communication terminal 18, which are the transmission source and the transmission destination in the communication in which the communication fault has occurred.

In S60, each network switch 12 transmits information about a discard frame that satisfies the read conditions, among recorded discard frames, to the management server 16.

The management server 16 receives the information about a discard frame transmitted from each network switch 12. When information about a discard frame is output by a network switch 12 that is not desired to discard a frame, the network administrator who manages the management server 16 confirms the discard reason code in the output result and provides suitable handling, thereby solving the communication fault.

The management server 16 may record therein, for example, a combination of information uniquely identifying the network switch 12 and the output result of information about a discard frame. This may be performed in combination with a program by which a network switch 12 that may be on a path for relaying a frame, that is, a network switch 12 that is not desired to discard the frame is extracted based on the transmission source IP address and the destination IP address, thereby enabling a fault location to be identified on the basis of the output result.

Next, with reference to FIG. 19, the flow of processing performed for a repeatable communication fault will be described. When a communication fault is repeatable, upon occurrence of a communication fault, extraction conditions are set and recording of information about a discard frame is started.

In S70, a communication fault is detected in a network switch 12, and the network switch 12 transmits information representing the communication fault to the management server 16. The management server 16 receives the information representing the communication fault.

In S80, the network administrator confirms the information representing the communication fault received by the management server 16. The network administrator sets extraction conditions that are to be given from the management server 16 to each network switch 12, and the management server 16 transmits the extraction condition data to each network switch 12. Conditions set as the extraction conditions are the IP addresses of the communication terminal 10 and the communication terminal 18.

When the extraction conditions are set, an instruction to start recording is issued from the management server 16 to each network switch 12. Setting of extraction conditions and setting of record start and record stop processes are more effective when each network switch 12 is registered in the management server 16 and the setting of conditions and the setting of the processes are performed in combination with a program that concurrently sets the conditions and the processes for a plurality of network switches 12.

In S85, owing to the repeatability of the communication fault, the communication fault is detected again in the network switch 12, and the network switch 12 transmits information representing the communication fault to the management server 16. The management server 16 receives the information representing the communication fault.

In S90, the network administrator confirms the information representing the communication fault received by the management server 16. The network administrator sets read conditions that are to be given from the management server 16 to each network switch 12, and the management server 16 transmits the read condition data to each network switch 12. Each network switch 12 receives the read condition data. Conditions set as the read conditions are time conditions prior to and subsequent to the time at which a communication fault is detected, and the IP addresses of the communication terminal 10 and the communication terminal 18, which are the transmission source and the transmission destination in the communication in which the communication fault has occurred.

In S100, each network switch 12 transmits information about a discard frame that satisfies the read conditions to the management server 16.

The management server 16 receives the information about a discard frame transmitted from each network switch 12. When information about a discard frame is output by a network switch 12 that is not desired to discard a frame, the network administrator who manages the management server 16 confirms the discard reason code in the output result and provides suitable handling, thereby solving the communication fault.

The management server 16 may record therein, for example, a combination of information uniquely identifying the network switch 12 and the output result of information about a discard frame. This may be performed in combination with a program by which a network switch 12 that may be on a path for relaying a frame, that is, a network switch 12 that is not desired to discard the frame is extracted based on the transmission source IP address and the destination IP address, thereby enabling a fault location to be identified on the basis of the output result.

Note that although, in the embodiment described above, each component of the data-center communication system 2 has been described, each component of the user-environment communication system 3 may perform similar processing.

Specifically, the network switches 20 and the management server 24 of the user-environment communication system 3 may perform processing similar to that performed by the network switches 12 and the management server 16 of the data-center communication system 2, respectively.

As described above, the network switch according to the present embodiment determines whether or not a frame is to be discarded. The network switch transmits a frame determined not to be discarded to a device that is set as the destination, by using the information prepended and appended to the packet of this frame. The network switch extracts given information from a packet of a frame determined to be discarded, and outputs the extracted information. This may enable failure analysis to be achieved without performing packet capture.

Conditions regarding the transmission source IP address or the destination IP address set in a packet contained in a frame are included in the extraction conditions or the read conditions. Thereby, information included in the packet of a frame discarded in communication between specific communication terminals may be acquired.

In the embodiment described above, the management server detects a communication fault, and sets conditions in accordance with the detected communication fault, in a network switch. The network switch determines whether or not a frame is to be discarded, and transmits a frame determined not to be discarded to a device set as the destination in information prepended and appended to a packet of the frame in question. The network switch extracts given information from the packet of the frame determined to be discarded, and outputs the given information. Thus, information included in the packet of the discard frame may be recorded in accordance with the set conditions.

In a network switch, given information is extracted from a packet at the layer 3 of the OSI basic reference model, and thus it may be detected where in the network the data to be transmitted and received is discarded as a discard frame.

Based on information output from a network switch, the administrator of the network may verify whether or not a frame of communication between designated specific terminals is discarded in the network switch in question.

When a plurality of network switches on the path include communication fault detection units, the administrator of the network repeatedly performs the above processing and may know where on the path a frame is discarded.

In the above, the case where information about a discard frame is the reception time of the discard frame, information on the reception port of the discard frame, and the discard reason code for the discard frame has been described by way of example, but embodiments are not limited thereto. For example, a discard frame and the reception time of the discard frame may be assumed as information about the discard frame.

In the above, the case where the management network switch 13 or 21 does not perform processing of recording information about a discard frame has been described by way of example, but embodiments are not limited thereto. For example, the management network switch 13 or 21, as well as the network switches 12 and 20, may perform processing of recording information about a discard frame.

In the above, the case where a plurality of network switches 12 and 20 perform processing of recording information about a discard frame has been described by way of example; however, at least one network switch may perform processing of recording information about a discard frame.

In the above, the case where an instruction to start recording or stop recording is issued from the management server to the network switches has been described by way of example, but embodiments are not limited thereto. For example, each network switch may continue to circularly record discard information in a given storage area, and, at the time point at which the network switch receives read conditions from the management server, read and output discard information that is stored in the given storage area and satisfies the received read conditions.

In the above, the case where a specification for read conditions is provided from the management server to the network switches has been described by way of example, but embodiments are not limited thereto. For example, at the time point at which each network switch detects the number of pieces of discard information with the same combination of a transmission source IP address and a destination IP address, among discard information recorded in a given storage area, has reached a given number or has reached a given rate, each network switch may voluntarily transmits these pieces of discard information to the management server. Instead of discard information, an alarm may be transmitted (desirably, the transmission source IP address and the destination IP address are transmitted at the same time) so as to call attention of the administrator of the network.

Figure 18:
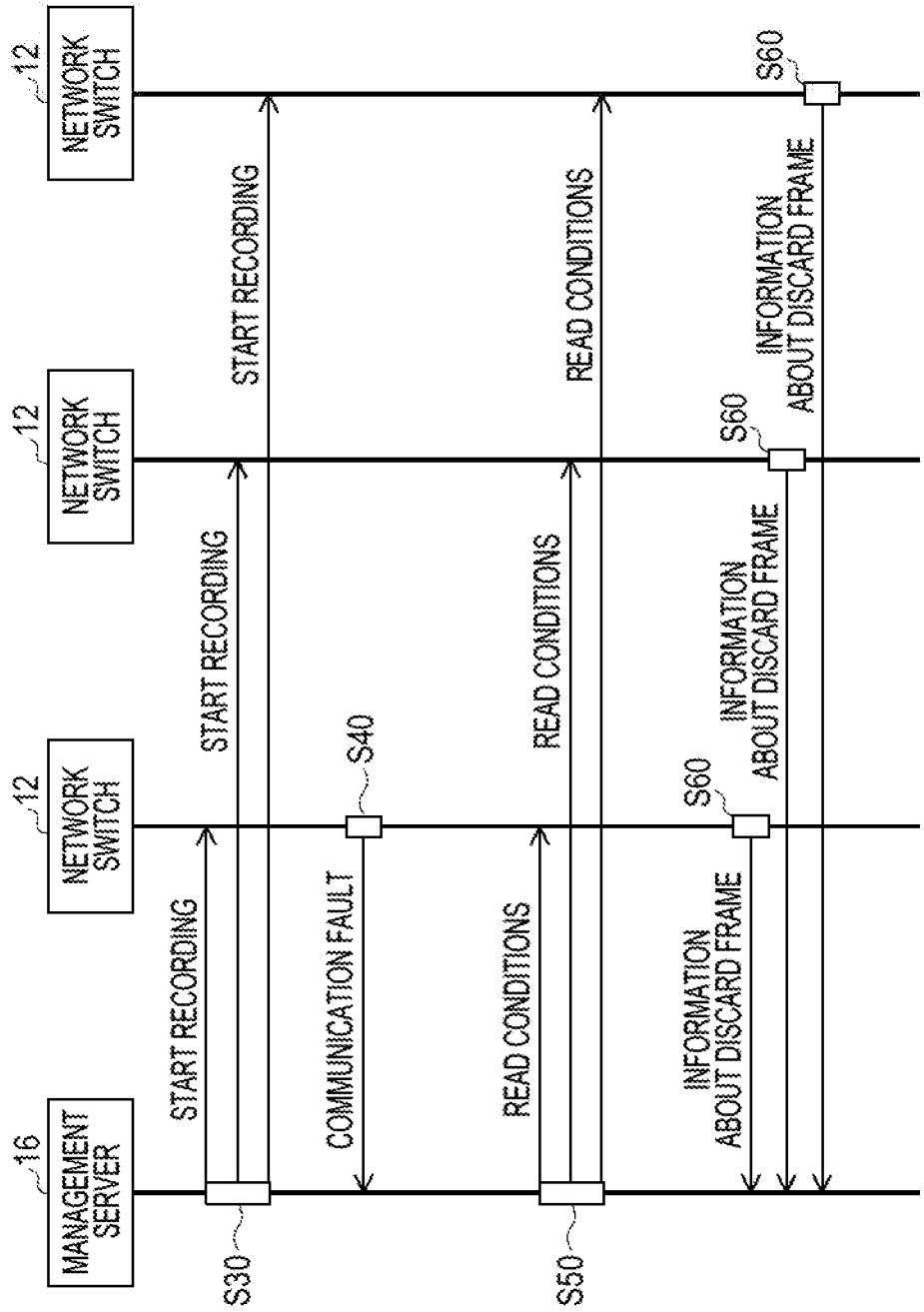
FIG. 18 is a sequence diagram illustrating an example of a process of a communication system.
Figure 19:
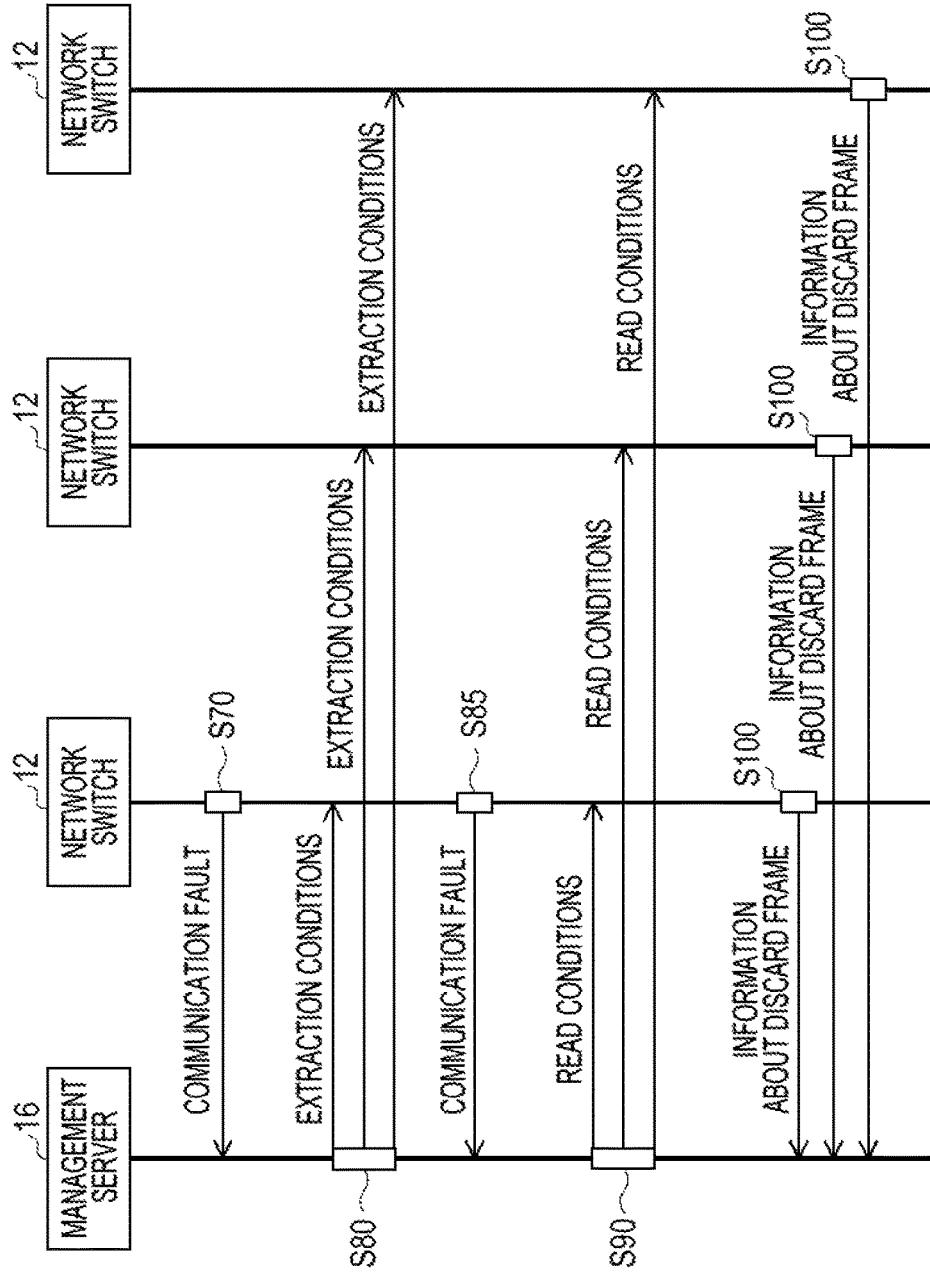
FIG. 19 is a sequence diagram illustrating an example of a process of a communication system.

In FIG. 18 and FIG. 19, read conditions are transmitted at once from the management server to each network switch by way of example, but embodiments are not limited thereto. Particularly, when an alarm is transmitted from network switches to the management server as described above, read conditions may be selectively (for example, sequentially) transmitted from the management server to network switches that the administrator of the network has determined as desirable network switches for failure analysis. In this case, the read conditions transmitted to the network switches may be fixed or may vary (differ) as the analysis proceeds.

In the above, a network switch that is an example of a relay apparatus has been described. However, the relay apparatus is not limited thereto but may be another network device such as a router.

In the above, the manner in which the relay processing program 310 is stored (installed) in advance in the storage unit 303 has been described; however, embodiments are not limited thereto. The program may be provided in a form in which the program is recorded in a storage medium such as compact disc read-only memory (CD-ROM), digital versatile disc ROM (DVD-ROM), or universal serial bus (USB) memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A relay apparatus, comprising:
a memory; and
a processor coupled with the memory and the processor configured to
    determine whether a frame received from a first device is to be discarded, the frame including first information set at a first communication layer and second information set at a second communication layer different from the first communication layer,
    transmit the frame to a second device upon determining that the frame is not to be discarded, the second device being set as a destination in the first information,
    upon determining that the frame is to be discarded, extract third information from based on the second information, the third information including a reception time of the frame,
    determine whether the reception time satisfies a predetermined condition, and
    output the third information upon determining that the reception time satisfies the predetermined condition.

2. The relay apparatus according to claim 1, wherein the processor is configured to
determine whether the third information satisfies a predetermined condition, and
output the third information upon determining that the third information satisfies the predetermined condition.

3. The relay apparatus according to claim 2, wherein the predetermined condition includes a condition regarding a transmission source internet protocol (IP) address or a destination IP address set in the second information, the transmission source IP address being an IP address of a device which has transmitted the frame, the destination IP address being an IP address of a device to which the frame is to be transmitted.

4. The relay apparatus according to claim 1, wherein the processor is configured to
determine whether the third information satisfies a first condition, and
record the third information in the memory upon determining that the third information satisfies the first condition.

5. The relay apparatus according to claim 4, wherein the processor is configured to
read the third information from the memory,
determine whether the third information satisfies a second condition, and
output the third information upon determining that the third information satisfies the second condition.

6. The relay apparatus according to claim 1, wherein the second communication layer is a communication layer above the first communication layer.

7. A non-transitory computer-readable recording medium having stored therein a program that causes a computer to execute a process, the process comprising:
determining whether a frame received from a first device is to be discarded, the frame including first information set at a first communication layer and second information set at a second communication layer different from the first communication layer;
transmitting the frame to a second device upon determining that the frame is not to be discarded, the second device being set as a destination in the first information;
upon determining that the frame is to be discarded, extracting third information based on the second information, the third information including a reception time of the frame,
determining whether the reception time satisfies a predetermined condition, and
outputting the third information upon determining that the reception time satisfies the predetermined condition.

8. The non-transitory computer-readable recording medium according to claim 7, the process comprising:
determining whether the third information satisfies a predetermined condition; and
outputting the third information upon determining that the third information satisfies the predetermined condition.

9. The non-transitory computer-readable recording medium according to claim 8, wherein
the predetermined condition includes a condition regarding a transmission source internet protocol (IP) address or a destination IP address set in the second information, the transmission source IP address being an IP address of a device which has transmitted the frame, the destination IP address being an IP address of a device to which the frame is to be transmitted.

10. The non-transitory computer-readable recording medium according to claim 7, the process comprising:
determining whether the third information satisfies a first condition; and
recording the third information in the memory upon determining that the third information satisfies the first condition.

11. The non-transitory computer-readable recording medium according to claim 10, the process comprising:
reading the third information from the memory;
determining whether the third information satisfies a second condition; and
outputting the third information upon determining that the third information satisfies the second condition.

12. The non-transitory computer-readable recording medium according to claim 7, wherein
the second communication layer is a communication layer above the first communication layer.

13. A relay method, comprising:
   determining, by a computer, whether a frame received from a first device is to be discarded, the frame including first information set at a first communication layer and second information set at a second communication layer different from the first communication layer;
   transmitting the frame to a second device upon determining that the frame is not to be discarded, the second device being set as a destination in the first information;
   upon determining that the frame is to be discarded, extracting third information based on the second information, the third information including a reception time of the frame,
   determining whether the reception time satisfies a predetermined condition, and
   outputting the third information upon determining that the reception time satisfies the predetermined condition.

14. The relay method according to claim 13, the process comprising:
   determining whether the third information satisfies a predetermined condition; and
   outputting the third information upon determining that the third information satisfies the predetermined condition.

15. The relay method according to claim 14, wherein the predetermined condition includes a condition regarding a transmission source internet protocol (IP) address or a destination IP address set in the second information, the transmission source IP address being an IP address of a device which has transmitted the frame, the destination IP address being an IP address of a device to which the frame is to be transmitted.

16. The relay method according to claim 13, the process comprising:
   determining whether the third information satisfies a first condition; and
   recording the third information in the memory upon determining that the third information satisfies the first condition.

17. The relay method according to claim 16, the process comprising:
   reading the third information from the memory;
   determining whether the third information satisfies a second condition; and
   outputting the third information upon determining that the third information satisfies the second condition.

18. The relay method according to claim 13, wherein
   the second communication layer is a communication layer above the first communication layer.

19. The relay apparatus according to claim 1, wherein the third information further includes a discard reason code of the frame and information on a reception port of the frame.

* * * * *